United States Patent [19]

Onooka

[11] 4,255,770
[45] Mar. 10, 1981

[54] DUSTPROOF TYPE MAGNETIC DISC APPARATUS

[75] Inventor: Yasushi Onooka, Kamakura, Japan

[73] Assignee: Mitsubishi Denki Kabushiki Kaisha, Tokyo, Japan

[21] Appl. No.: 41,195

[22] Filed: May 21, 1979

[30] Foreign Application Priority Data

May 23, 1978 [JP] Japan .................................. 53/69592

[51] Int. Cl.³ ............................................. G11B 17/02
[52] U.S. Cl. ......................................... 360/69; 360/98
[58] Field of Search ................................... 360/97-99, 360/69, 71

[56] References Cited

U.S. PATENT DOCUMENTS

| | | | |
|---|---|---|---|
| 3,593,327 | 7/1971 | Shill | 360/97 |
| 3,731,291 | 5/1973 | Walsh | 360/98 |

Primary Examiner—Robert S. Tupper
Attorney, Agent, or Firm—Oblon, Fisher, Spivak, McClelland & Maier

[57] ABSTRACT

A dustproof type magnetic disc apparatus has structure for starting rotation of a magnetic recording medium, after driving a blower for dust separation for a predetermined time, by putting on a start switch for driving the magnetic recording medium.

3 Claims, 6 Drawing Figures

DUSTPROOF TYPE MAGNETIC DISC APPARATUS

BACKGROUND OF THE INVENTION

1. Field of the Invention

The present invention relates to an improved dustproof type magnetic disc apparatus which effectively separates dust before starting the rotation of a magnetic disc.

2. Description of the Prior Arts

In general, it is necessary to recycle air in a magnetic disc apparatus by feeding clean air into the magnetic disc apparatus so as to prevent deposition of dust in air and to cool the apparatus.

In the conventional magnetic disc apparatus, a magnetic disc pack is driven by putting on a start switch to cause pressure difference between inner surface parts and outer surface parts and to maintain the dust on the inner part whereby the dust is not easily discharged from the inner surface part even though clean air is fed to deposit the dust on the surface of the magnetic disc pack. This causes trouble in the magnetic recording and deterioration of the magnetic disc pack.

Summary of the Invention

It is an object of the present invention to provide a dustproof type magnetic disc apparatus which can prevent the deposition of dust on a magnetic disc pack.

The foregoing and other objects of the present invention have been attained by providing a dustproof type magnetic disc apparatus having a structure starting a relation of a magnetic recording medium, after driving a blower for dust separation for a predetermined time, by putting on a start switch for driving the magnetic recording.

Detailed Description of the Preferred Embodiments

Figure 1:
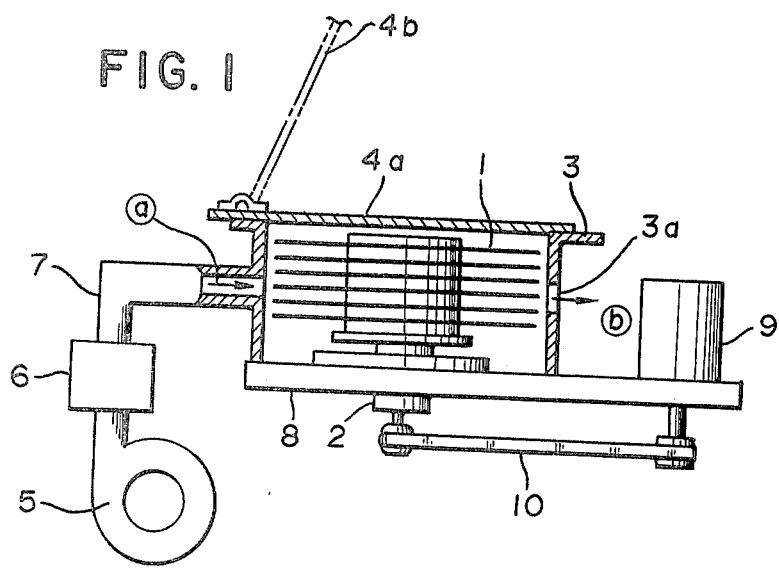
FIG. 1 is a schematic view of one embodiment of a magnetic disc apparatus.

FIG. 1 shows one embodiment of the structure of the magnetic disc apparatus wherein the reference (1) designates a magnetic disc pack; (2) designates a spindle for holding the magnetic disc pack; (3) designates a shroud; (3a) designates an air outlet on the shroud (3); (4a) designates a ceiling for sealing the magnetic disc pack (1) within the shroud (3); (5) designates a blower for feeding air into the shroud (3); (6) designates a filter for cleaning air fed by the blower (5); (7) designates a duct for feeding clean air; (8) designates a base; (10) designates a belt for transmitting the rotary power of a motor (9) to the spindle (2).

In structure, the clean air is fed as shown by the arrow line ⓐ into the magnetic disc pack (1) and is discharged as shown by the arrow line ⓑ.

Thus, the ceiling (4a) is opened at the time fitting the magnetic disc pack (1) as shown by the dotted line (4b) whereby dust becomes a contaminant in the magnetic disc pack (1).

In the conventional magnetic disc apparatus, the motor (9) is started at the time of fitting the magnetic disc pack (1) or at the time of putting on the switch, after the fitting, whereby the magnetic disc pack (1) fitted on the spindle (2) is rotated. In operation, a pressure difference is caused between the inner surface part and the outer surface part of the magnetic disc pack to give a lower pressure on the inner surface part in comparison with that on the outer surface part. The dust contaminant formed at the opening and the shutting of the ceiling (4a), is maintained on the inner surface part. Even though clean air is fed from the outside into the magnetic disc pack, the dust on the inner surface part is not easily discharged and the dust in the air is deposited on the surfaces of the magnetic disc pack and trouble for magnetic recording is caused or a magnetic disc pack is deteriorated.

The object of the present invention is to overcome these disadvantages and to provide a dustproof type magnetic disc apparatus which has an interlocking function for preventing rotation of the motor (9) for a predetermined term after fitting the magnetic disc pack (1) on the spindle (2) and then closing the ceiling (4a) or putting on the start switch.

Referring to the drawings, the embodiment of the present invention will be illustrated.

In the embodiment of the apparatus of the present invention, the dust contaminant formed in the magnetic disc pack (1) in the fitting operation is discharged out of the system by driving the blower for a predetermined term and then, the motor (9) is driven to rotate the magnetic disc pack (1) fitted on the spindle (2). Even though the pressure difference is caused between the inner surface part and the outer surface part to move the dust on the inner surface part, the absolute concentration of the dust is remarkably lower than that of the conventional apparatus whereby the deposition of the dust on the magnetic disc pack is reduced to prevent trouble with the magnetic recording or to prevent deterioration of the magnetic disc pack.

Figure 2:
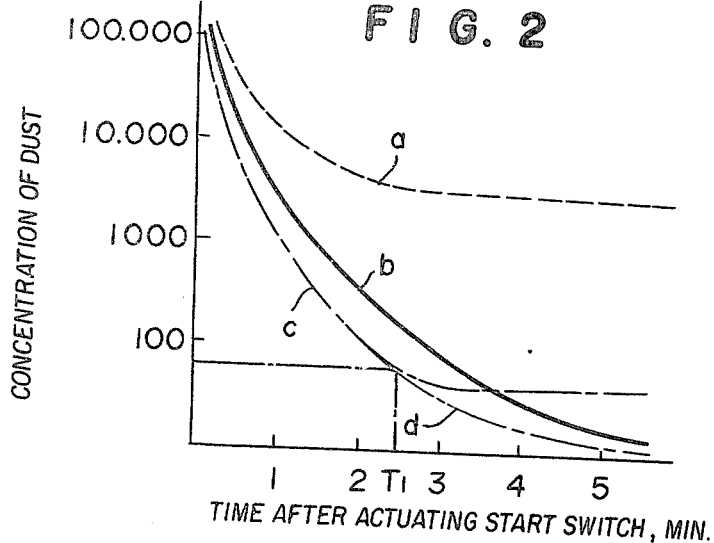
FIg. 2 is a graph showing the variation of the concentration of dust versus time after putting on a start switch or fitting a disc pack.

The conditions shown in the graph of FIG. 2 show concentrations of the dust in the magnetic disc pack (1) at the time of closing the ceiling (4a) to use the apparatus, and times after putting on the start switch.

In the example shown in FIG. 2, a blower pressure is set to 30 mm WG and an air flow rate is set at 860 liter/minute (Q) whereby 50 times of air is passed through in the disc pack (17 liter) for 1 minute whereby the dust is gradually removed. In order to give a clean degree of less than 100, of the class measured by Federal Standard No. 209 B, it takes 2-3 minutes as shown in FIG. 2 wherein the size of the dust is 0.5 μm which is the typical size of the dust.

In FIG. 2, (a) is a curve of concentrations of dust on the inner surface part of the magnetic disc pack (1) in the conventional apparatus;

(b) is a curve of concentrations of dust on the outer surface part of the magnetic disc pack (1) in the conventional apparatus;

(c) is a curve of concentrations of dust on the inner surface part of the magnetic disc pack (1) in the apparatus of the present invention; and (d) is a curve of concentrations of dust on the outer surface part of the magnetic disc pack (1) in the apparatus of the present invention. The time of $T_1$ is the time starting the rotation of the magnetic disc pack (1).

In accordance with the present invention, an interlocking means is used for preventing rotation of the motor for a predetermined term after closing the ceiling or putting on the start switch. The interlocking means can be any kind of delay switch which delays the rotation of the spindle from the start of the blower for a desired term such as 2.5 minutes.

One example of a typical interlocking means comprises an AND circuit and a delay pulse forming circuit.

Figure 3:
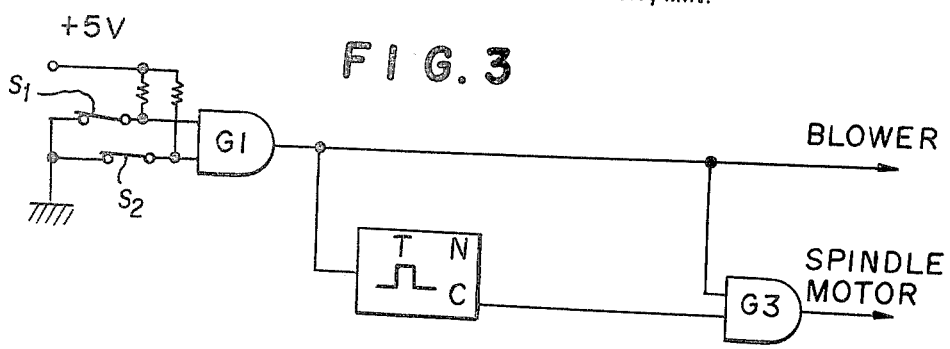
FIG. 3 is a circuit diagram of one embodiment of an interlocking means.

Referring to FIG. 3, one example of the interlocking means will be illustrated.

Figure 4:
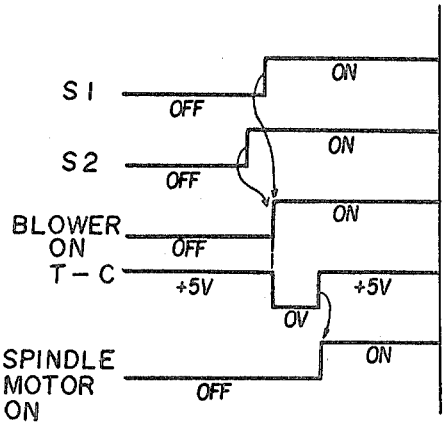
FIG. 4 shows operational states of the parts in the embodiment of FIG. 3.

The interlocking means is connected to a driving means for rotating a blower motor and a spindle motor with a separate power source of 5 volts. A start switch ($S_1$) and a cover interlock switch ($S_2$) are connected to AND gate (G-1) which is directly connected to the driving means for rotating the blower motor and is connected to a delay pulse forming circuit (T) which is further connected to AND gate (G-3) which is connected to the driving means for rotating the spindle motor. The voltage (+5 V) of the separate power source can be normally applied to input terminals of the AND gate (G-1). When both the start switch ($S_1$) and the cover interlock switch ($S_2$) are set to the starting positions, the voltage (+5 V) is applied to each input terminal of the gate and the AND gate is actuated whereby the blower motor is started. The delay pulse forming circuit (T) is also actuated. The delay pulse forming circuit (T), (T-1), (T-2), (T-3) can be a circuit comprising a clockpulse generator for generating one clockpulse per second and a counter for counting up the predetermined number of clockpulses. However, the pulse is generated after a certain delay time. When the blower motor is rotated and the pulse is generated from the delay pulse forming circuit (T), the AND gate (G-3) is actuated to start the spindle motor. The time chart is shown in FIG. 4.

In the above-mentioned example, the spindle motor is started after a certain delay time (2.5 minutes) from starting the blower motor. Sometimes, it is difficult to remove the dust from the magnetic disc by such simple operation. It is preferable to start the blower motor and then, to start the spindle motor after a certain delay time and then, to stop the spindle motor and further to start the spindle motor, whereby the dust, especially adhesive dust on the magnetic disc, is substantially removed.

Figure 5:
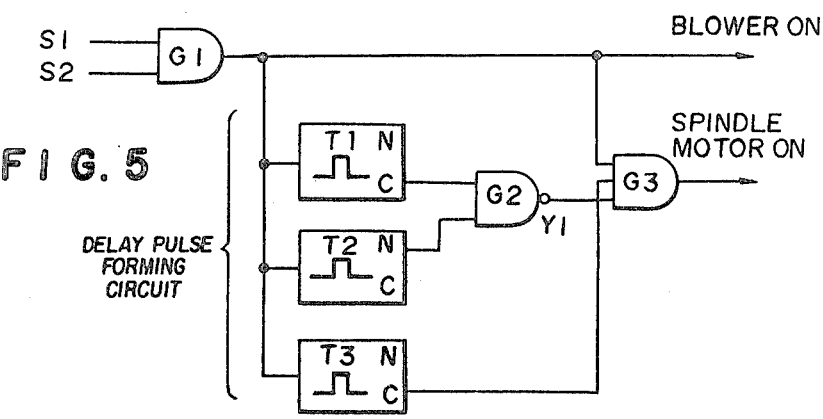
FIG. 5 is a circuit diagram of another embodiment of an interlocking means.

FIG. 5 shows an example of the interlocking means for the latter operation. The start switch ($S_1$) and the cover interlock switch ($S_2$) are connected to the AND gate (G-1) which is connected directly to the driving means for rotating the blower motor and also to three delay pulse forming circuits (T-1 to T-3) in parallel. Two of the three delay pulse forming circuits are connected to a NAND gate (G-2). The NAND gate and the other delay pulse forming circuit, and the AND gate (G-1) are connected to the AND gate (G-3) which is further connected to the spindle driving means for rotating the spindle motor.

When both the start switch ($S_1$) and the cover interlock switch ($S_2$) are set to starting positions, the voltage source of 5 volts is applied to each input terminal of the gate (G1) and the blower motor is started.

Figure 6:
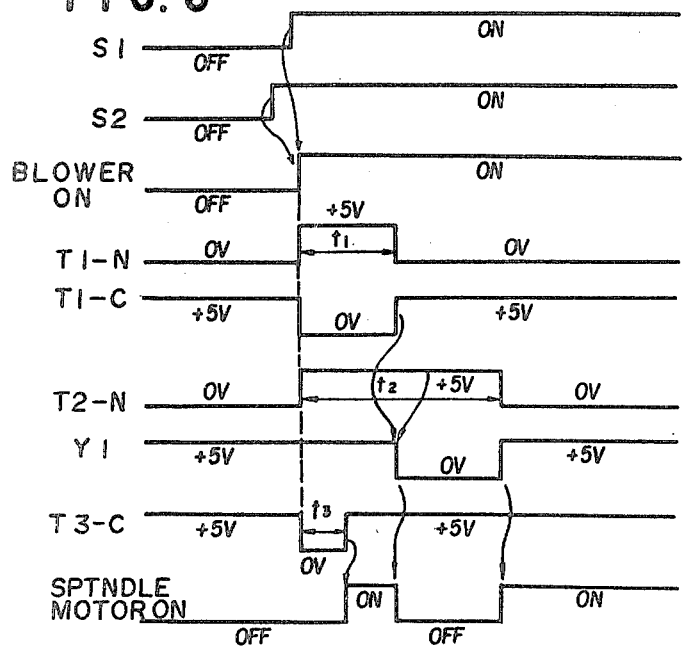
FIG. 6 shows operational states of the parts in the embodiment of FIG. 5.

The condition of the rotation of the blower motor is input to the delay pulse forming circuits (T-1 to T-3). Because of the NAND gate (G-2), the spindle motor is started after a certain delay time (2.5 minutes) and then, is stopped for a certain time (1 minute) and then, is started again after a further delay time (3 minutes). These delay times can be easily adjusted by selecting the delay pulse forming circuits (T-1 to T-3). The time chart is shown in FIG. 6.

It is also possible to use other kinds of known delay circuits in order to start the spindle motor after a certain delay time.

The embodiments of FIGS. 3 to 6 are described for purposes of illustration only and are not intended to limit the present invention.

In accordance with the present invention, the concentration of the dust in the magnetic disc pack is remarkably decreased and even when a magnetic disc pack is not exchanged, the operation is effective for removing the dust on the head and the magnetic disc pack.

The timing of the start of the motor after putting on the start switch can be easily controlled by using a delay means such as a mechanical delay switch, a thyristor delay switch and other delay switches which are used for the purpose of delaying an actuation.

What is claimed is:

1. A dustproof type magnetic disc apparatus which comprises:
   a magnetic disc pack containing magnetic recording discs; a shroud for providing a housing for said magnetic disc pack;
   a ceiling means for closing said shroud after said magnetic disc pack is placed within said shroud;
   means for providing inlet air to said shroud;
   an outlet means provided in said shroud for said inlet air;
   a blower means for providing said inlet air to said shroud; a spindle means provided through an opening in said shroud and connected to said magnetic disc pack for rotating said magnetic disc pack;
   a motor for driving said blower means;
   a motor for driving said spindle means; and
   an interlocking means connected in mutual relationship to said motor for driving said blower means and said motor for driving said spindle means, said interlocking means including a first AND gate, the inputs of which are connected to receive a signal upon the closing of said ceiling means and the actuation of a start switch, the output from said first AND gate causing the actuation of said motor for driving said blower means, said inlet air provided by said blower means forcing contaminants within said shroud out said outlet means provided within said shroud; said interlocking means further including a second AND gate connected between said first AND gate and said motor for driving said spindle means and of which one input receives the output from said first AND gate; and a delay means connected between the output from said first AND gate and the other input to said second AND gate, said delay means being actuated by the output from said first AND gate and providing an output signal to the other input of said second AND gate a predetermined period of time after the actuation of said motor for driving said blower means; said second AND gate, upon receipt of the signal from said delay means, actuating said motor for driving said spindle means, whereby contaminants are removed from said shroud and said magnetic disc pack prior to magnetic recording on said magnetic recording disc.

2. A dustproof type magnetic disc apparatus according to claim 1 wherein said delay means comprises a clockpulse generator for generating one clock pulse per specified unit of time and a counter for counting a predetermined number of the clock pulses; said delay means generating an output when said predetermined number of clock pulses are counted.

3. A dustproof type magnetic disc apparatus according to claim 1 wherein said interlocking means further includes a NAND gate interposed between said delay means and said second AND gate and said delay means consists of at least three delay pulse forming circuits connected in parallel with the outputs from two of said delay pulse forming circuits providing inputs to said NAND gate, and the output from the third delay pulse forming circuit forming a third input to said second AND gate, whereby the start operation and a stop operation of the motor for driving the spindle can be repeated a predetermined number of times to reduce the concentration of contaminants within said shroud and on said magnetic disc pack.

* * * * *